(12) United States Patent
Arvapally et al.

(10) Patent No.: US 12,501,499 B2
(45) Date of Patent: Dec. 16, 2025

(54) METHOD TO EXTEND ORAN FRONTHAUL SPECIFICATIONS TO SUPPORT NBIOT

(71) Applicant: Mavenir Systems, Inc., Richardson, TX (US)

(72) Inventors: Radhakrishna Arvapally, Bangalore (IN); Brijesh Unnikrishnan, Bangalore (IN); Charles Santhosam Lourdu Raja, Bangalore (IN); Pankaj Kumar, New Delhi (IN); Nithin Kumar, Bengaluru (IN)

(73) Assignee: Mavenir Systems, Inc., Richardson, TX (US)

( * ) Notice: Subject to any disclaimer, the term of this patent is extended or adjusted under 35 U.S.C. 154(b) by 249 days.

(21) Appl. No.: 18/183,698

(22) Filed: Mar. 14, 2023

(65) Prior Publication Data

US 2023/0309160 A1 Sep. 28, 2023

(30) Foreign Application Priority Data

Mar. 24, 2022 (IN) .............................. 202221016724

(51) Int. Cl.
*H04W 76/12* (2018.01)
*G16Y 30/00* (2020.01)
(52) U.S. Cl.
CPC ............. *H04W 76/12* (2018.02); *G16Y 30/00* (2020.01)
(58) Field of Classification Search
CPC .... H04W 76/12; H04W 88/085; G16Y 30/00; H04B 1/123
See application file for complete search history.

(56) References Cited

U.S. PATENT DOCUMENTS

| | | | |
|---|---|---|---|
| 11,516,721 B1* | 11/2022 | Kuppuswamy | H04W 40/02 |
| 2018/0014312 A1 | 1/2018 | Ezaki | |
| 2020/0344635 A1* | 10/2020 | Lu | H04W 76/15 |
| 2021/0105125 A1 | 4/2021 | Rajagopal | |
| 2022/0141876 A1* | 5/2022 | Gorain | H04L 27/2636 370/329 |

(Continued)

OTHER PUBLICATIONS

Extended European Search Report for corresponding European patent application 23163694.5; 8 pages, dated Aug. 18, 2023.

(Continued)

*Primary Examiner* — Sun Jong Kim
(74) *Attorney, Agent, or Firm* — Ruggiero McAllister McMahon LLC (57) ABSTRACT

A method is provided for enabling Narrowband Internet of Things (NBIOT) transport over fronthaul (FH) interface between distributed unit (DU) and radio unit (RU) for at least one of 4G Long Term Evolution (LTE) network and 5G New Radio (NR) network, which method includes: receiving, by an RU capable of at least one of NBIOT inband mode and NBIOT guardband mode, i) at least one of LTE and NR in-phase and quadrature (IQ) samples associated with a first endpoint, and ii) NBIOT IQ samples associated with a second endpoint; and configuring the RU functionality to be able to combine, in at least one of frequency domain and time domain, i) the at least one of LTE and NR in-phase and quadrature (IQ) samples associated with a first endpoint, and ii) the NBIOT IQ samples associated with a second endpoint.

16 Claims, 6 Drawing Sheets (56) References Cited

U.S. PATENT DOCUMENTS

| | | | |
|---|---|---|---|
| 2023/0231686 A1* | 7/2023 | Jeon | H04L 5/0091 370/329 |
| 2023/0262474 A1* | 8/2023 | Shim | H04W 72/04 370/329 |
| 2024/0396603 A1* | 11/2024 | Huang | H04B 7/0617 |

OTHER PUBLICATIONS

NGMN Alliance "NGMN Overview on 5G RAN Functional Decomposition", Feb. 24, 2018, ngmn Ltd, Frankfurt Germany.

* cited by examiner

FIG. 1

Inband DL

FIG. 2a

FIG. 2b Inband UL

Guardband DL

METHOD TO EXTEND ORAN FRONTHAUL SPECIFICATIONS TO SUPPORT NBIOT

BACKGROUND OF THE INVENTION

The present disclosure relates to Radio Access Network (RAN) for 4G- and 5G-based mobile networks, and relates more particularly to Open RAN (O-RAN) configuration for Narrowband Internet of Things (NBIOT) cells.

Currently, O-RAN standard based packet networking fronthaul (FH) interface between distributed unit (DU) and radio unit (RU) for 4G LTE and/or 5G New Radio (NR) radio access technologies (RAT) has attracted much attention in the wireless cellular communication industry. One of the primary reasons for such growth is that O-RAN specification allows interoperability and standardization of RAN components, e.g., O-RAN compliant DU (O-DU) and O-RAN compliant RU (O-RU), by including a unified interconnection standard over packet-based transport interfaces such as evolved Common Public Radio Interface (eCPRI) and Radio over Ethernet (ROE). This capability has enabled seamless integration of white-box hardware and open-source software elements from different component vendors for O-DUs and O-RUs.

O-RAN standard specification supports 4G and 5G NR radio access technologies (RAT) based layer 1 functional split 7.2x (FS-7.2x), in which frequency domain data in-phase/quadrature (IQ) samples and related control, management and synchronization information are carried over the fronthaul (FH) interface. This allows 4G and NR base-station systems (eNB and gNB) to be designed and deployed more cost effectively and efficiently. However, the current fronthaul O-RAN specifications for the control, user, and synchronization planes (CUS-plane) and management plane (M-plane) support only 4G LTE and 5G NR RATs. Specifically, the current O-RAN standard does not provide sufficient support to carry NBIOT carrier (of any mode, e.g., inband, guardband and/or standalone) data, control, and/or related management information over the FH interface. Currently, the O-RAN specification support relevant to NBIOT carriers is limited to subcarrier spacing (SCS) definition and Filter Index for NBIOT carriers. NBIOT is currently supported on traditional radios (non-O-RAN), such as common public radio interface (CPRI) radio as per 3GPP specification.

Therefore, there is a need for multiple enhancements in connection with O-RAN standards for seamless integration of NBIOT in O-RAN.

SUMMARY OF THE INVENTION

According to an example embodiment of the present disclosure, a set of additions to the current O-RAN standard is provided regarding C/U-plane and M-Plane requirements to enable NBIOT transport over the FH.

The additions presented in the present disclosure do not change with hybrid and hierarchical M-Plane models as they do not impact existing M-plane procedures. The additional parameters will be transported as part of existing user plane configuration, which is already defined in the standard for hybrid and hierarchical models.

According to an example embodiment of the present disclosure, in the case NBIOT inband and/or guardband-capable O-RAN radio unit (RU) (also referenced as RRU) receives i) LTE and/or NR IQ samples (signal) and ii) NBIOT IQ samples (signal) from separate endpoints (e.g., LTE/NR IQ samples from LTE/NR virtualized Distributed Unit (vDU) and NBIOT IQ samples from NBIOT VDU; or LTE/NR IQ samples (signal) and NBIOT IQ samples (signal) in different end points from a single common VDU), O-RAN RU is configured to be able to support combining LTE/NR signals and NBIOT inband/guardband signals in either frequency domain (e.g., by combining before FFT block) or in time domain (e.g., by combining after FFT block). Guardband mode refers to NB-IoT carrier being deployed in the guardband between two LTE carriers, and inband mode refers to NB-IoT carrier being deployed in resource blocks of an LTE carrier.

According to an example embodiment of the present disclosure, enhanced definition is added to two parameters, supportedtechnology-dl and supportedtechnology-ul, in YANG model under RU capability to support NBIOT. The YANG model defines a hierarchical data structure, which can be used for operations based on network configuration management protocols (e.g., Network Configuration Protocol (NETCONF) and Representational State Transfer Configuration Protocol (RESTCONF)), which operations can include configuration, status data, remote procedure calls (RPCs), and notifications.

According to an example embodiment of the present disclosure, the O-RAN radio unit (O-RU) (also referred to as remote radio unit (RRU)) is configured to expose its capability to support NBIOT (e.g., in at least one of standalone, inband and/or guardband mode) for each endpoint by exposing the supported-technology-dl and/or supported-technology-ul parameter(s) under tx-arrays and/or rx-arrays.

According to an example embodiment of the present disclosure, LTE/NR and NBIOT (e.g., in inband and/or guardband mode) shall configure separate endpoints at the radio. In this example embodiment, separate eAxC IDs will be used for LTE/NR and NBIOT (e.g., in inband and/or guardband mode).

According to an example embodiment of the present disclosure, a new parameter is added under low-level-tx-endpoints and/or low-level-rx-endpoints of User-plane YANG model defined in ORAN fronthaul M-plane specification, thereby enabling the O-RAN RU to know the mapping of NBIOT endpoint to corresponding LTE/NR endpoint.

According to an example embodiment of the present disclosure, instead of adding a new parameter to indicate the mapping between the end points of LTE/NR and NBIOT (e.g., in inband and/or guardband mode), a bit field in the existing Extended Antenna Carrier Identifier (eAxC-ID) parameter is used to determine the relation between LTE/NR and NBIOT (e.g., in inband and/or guardband mode) end points.

According to an example embodiment of the present disclosure, O-DU shall instruct O-RU to detect NBIOT Physical random access channel (NPRACH) by sending an existing O-RAN section type-3 C-Plane message.

According to an example embodiment of the present disclosure, required parameters to detect NPRACH shall be sent from O-DU to O-RU via M-plane during User-Plane configuration.

DETAILED DESCRIPTION OF THE INVENTION

Figure 1:
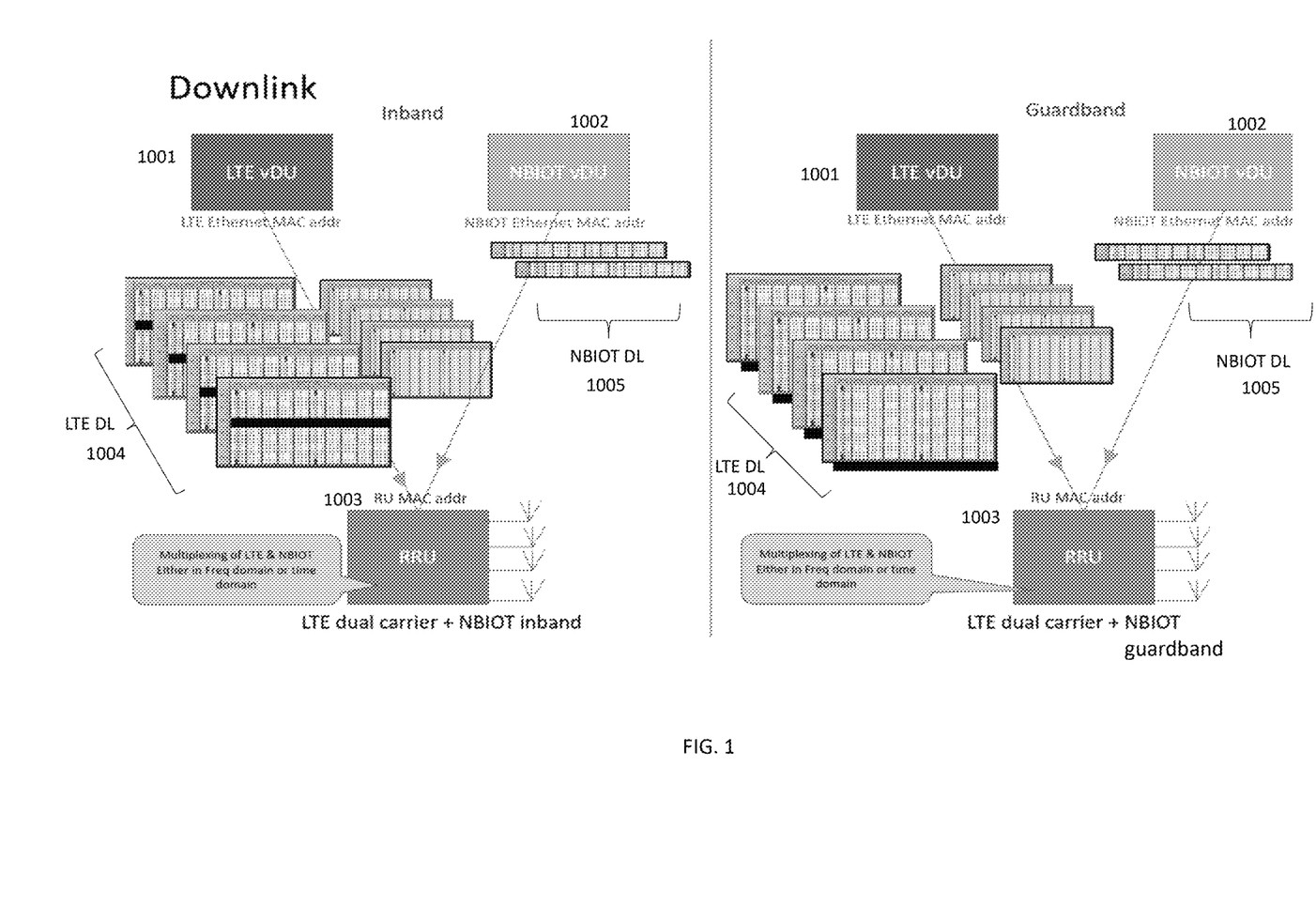
FIG. 1 is a block diagram illustrating an example embodiment of an RRU receiving LTE IQ samples and NBIOT IQ samples from separate endpoints (the left side of the figure showing NBIOT inband mode, and the right side of the figure showing NBIOT guardband mode).

FIG. 1 is a block diagram illustrating an example embodiment of an RRU receiving LTE IQ samples and NBIOT IQ samples from separate endpoints in DL transmissions. The left side of FIG. 1 shows NBIOT inband mode DL, and the right side of FIG. 1 shows NBIOT guardband mode DL. In the example embodiment shown in FIG. 1, two separate VDUs are present, i.e., LTE VDU 1001 (having associated LTE ethernet Media Access Control (MAC) address) and NBIOT VDU 1002 (having associated NBIOT ethernet MAC address). LTE VDU 1001 sends DL transmission of LTE IQ samples (referenced by 1004) in LTE dual carrier mode to RRU 1003 (having associated MAC address), and NBIOT VDU 1002 sends DL transmission of NBIOT IQ samples (referenced by 1005) in inband mode (shown on left side of FIG. 1) or in guardband mode (shown on the right side of FIG. 1) to the RRU 1003. The RRU 1003 performs multiplexing of LTE and NBIOT data in either frequency domain or time domain.

Figure 2A:
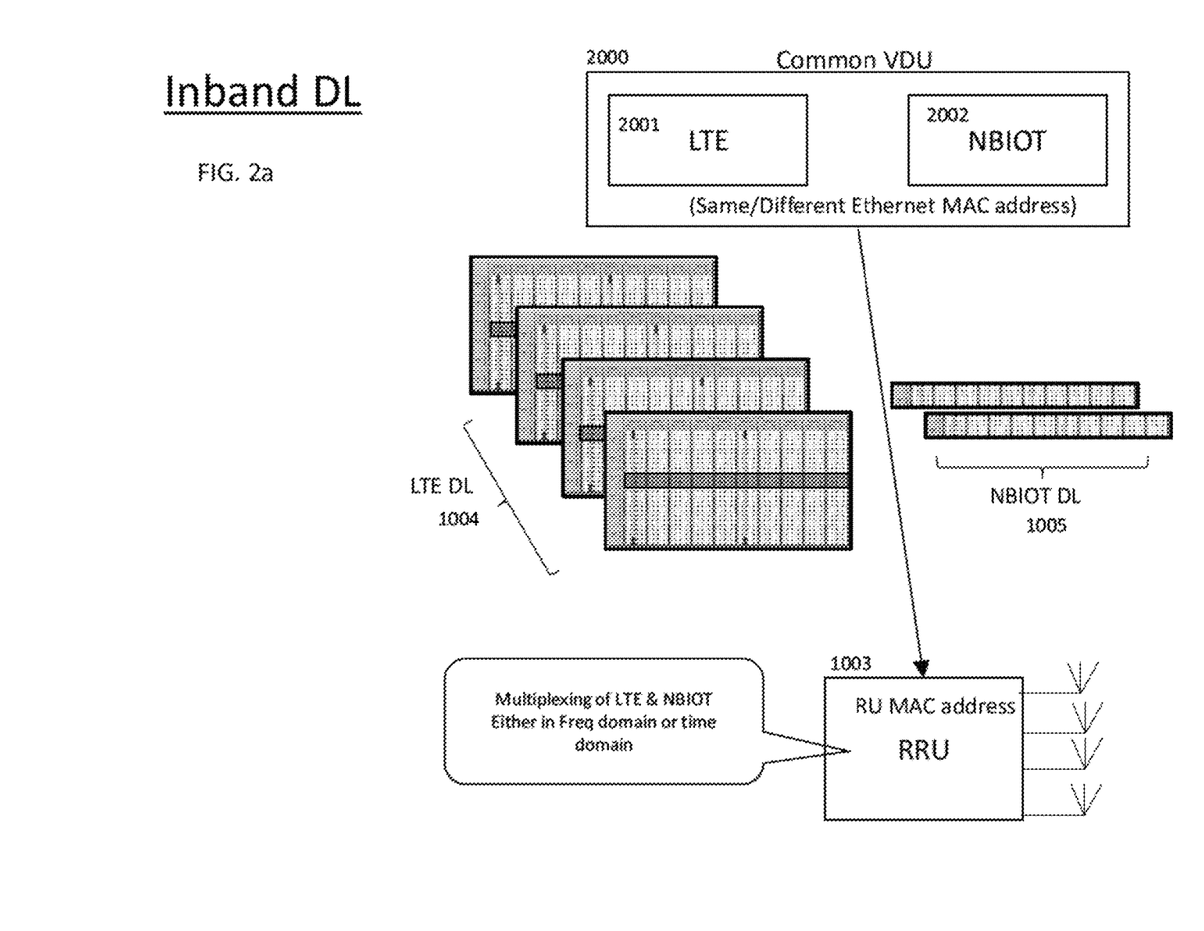
FIG. 2a is a block diagram illustrating an example embodiment of an RRU receiving LTE IQ samples and NBIOT IQ samples (in NBIOT inband mode, downlink (DL)) in different endpoints from a single common virtualized DU (VDU).

FIG. 2a is a block diagram illustrating an example embodiment of an RRU 1003 receiving LTE IQ samples and NBIOT IQ samples (in NBIOT inband mode, downlink (DL)) in different endpoints from a single common virtualized DU (VDU) 2000. In the example embodiment shown in FIG. 2a, the single common VDU 2000 for LTE 2001 and NBIOT 2002 sends i) DL transmission of LTE IQ samples (referenced by 1004) to RRU 1003 (having associated MAC address), and ii) DL transmission of NBIOT IQ samples (referenced by 1005) in inband mode to the RRU 1003. The single common VDU 2000 can have the same ethernet MAC address for the LTE 2001 and NBIOT 2002, or different ethernet MAC addresses can be assigned for the LTE 2001 and NBIOT 2002. The RRU 1003 performs multiplexing of LTE and NBIOT data in either frequency domain or time domain.

Figure 2B:
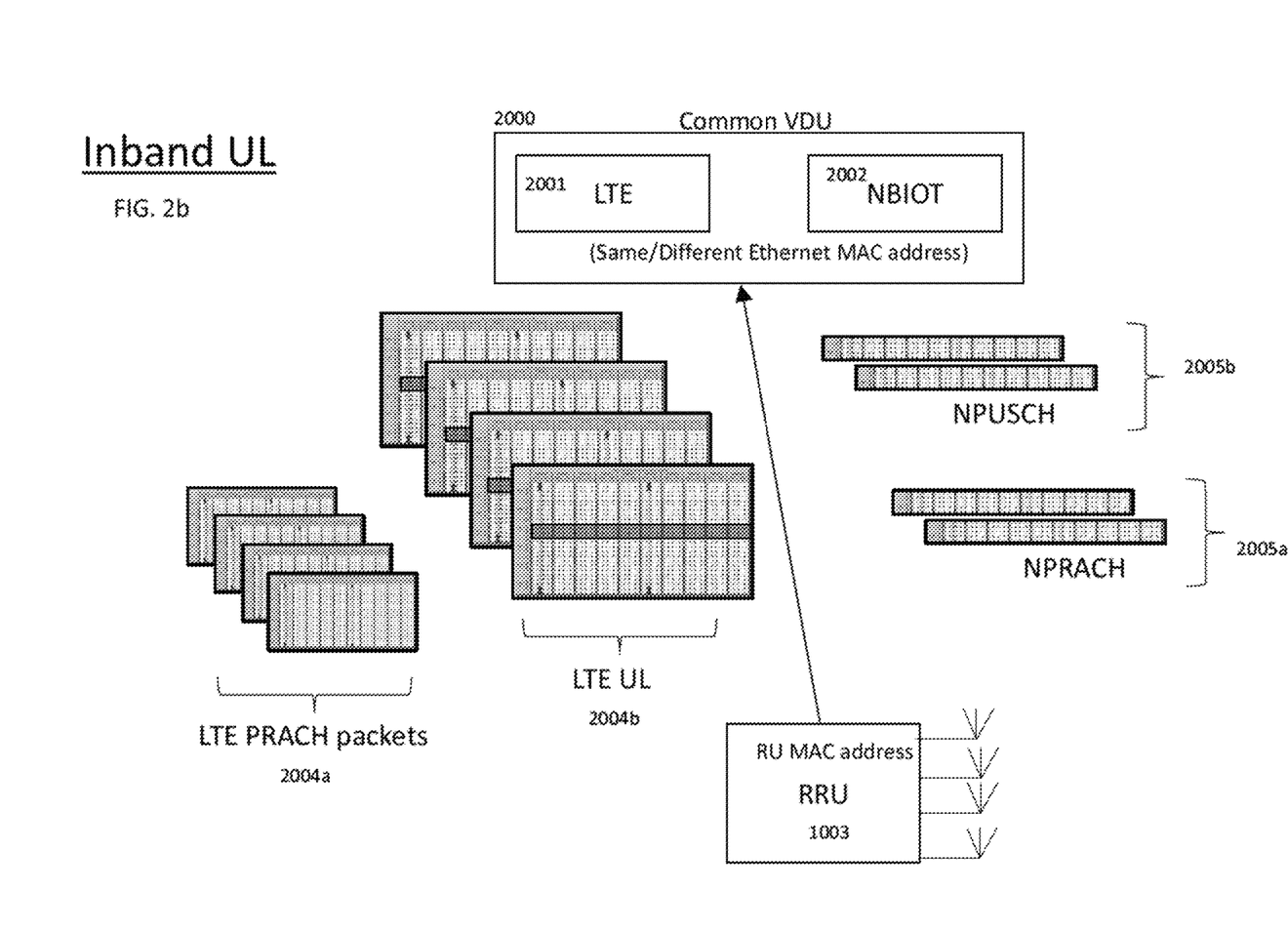
FIG. 2b is a block diagram illustrating an example embodiment of an RRU performing uplink (UL) transmission to LTE and NBIOT (in NBIOT inband mode) via a single common VDU.

FIG. 2b is a block diagram illustrating an example embodiment of an RRU 1003 performing uplink (UL) transmission to the single common VDU 2000 for LTE 2001 and NBIOT 2002 (in NBIOT inband mode). The UL transmission shown in FIG. 2b includes the following information elements: i) for LTE, Physical random access channel (PRACH) packets 2004a and LTE UL data 2004b; and ii) for NBIOT, narrowband physical random access channel (NPRACH) 2005a packets and narrowband physical uplink shared channel (NPUSCH) 2005b packets. The single common VDU 2000 can have the same ethernet MAC address for the LTE 2001 and NBIOT 2002, or different ethernet MAC addresses can be assigned for the LTE 2001 and NBIOT 2002.

Figure 3A:
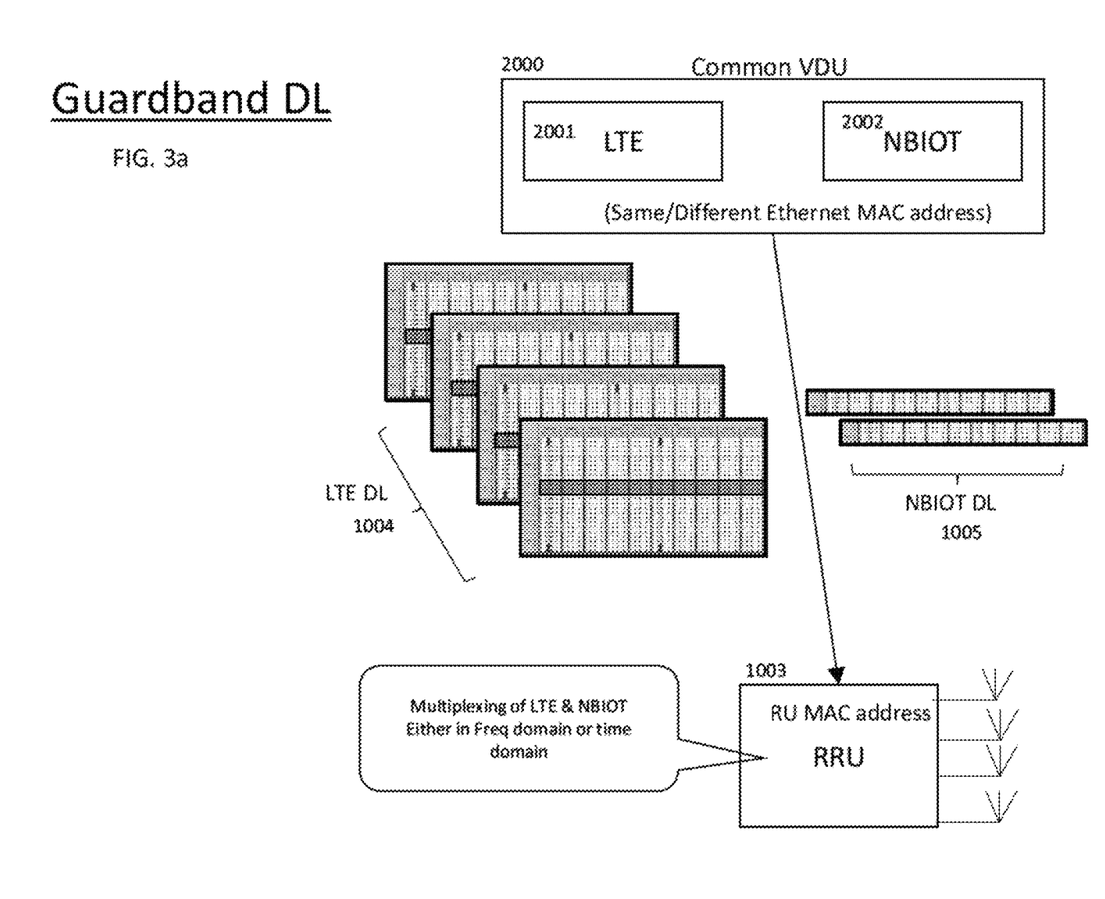
FIG. 3a is a block diagram illustrating an example embodiment of an RRU receiving LTE IQ samples and NBIOT IQ samples (in NBIOT guardband mode, DL) in different endpoints from a single common virtualized DU (VDU).

FIG. 3a is a block diagram illustrating an example embodiment of an RRU receiving LTE IQ samples and NBIOT IQ samples (in NBIOT guardband mode, DL) in different endpoints from a single common VDU 2000. In the example embodiment shown in FIG. 3a, the single common VDU 2000 for LTE 2001 and NBIOT 2002 sends i) DL transmission of LTE IQ samples (referenced by 1004) to RRU 1003 (having associated RU MAC address), and ii) DL transmission of NBIOT IQ samples (referenced by 1005) in guardband mode to the RRU 1003. The single common VDU 2000 can have the same ethernet MAC address for the LTE 2001 and NBIOT 2002, or different ethernet MAC addresses can be assigned for the LTE 2001 and NBIOT 2002. The RRU 1003 performs multiplexing of LTE and NBIOT data in either frequency domain or time domain.

Figure 3B:
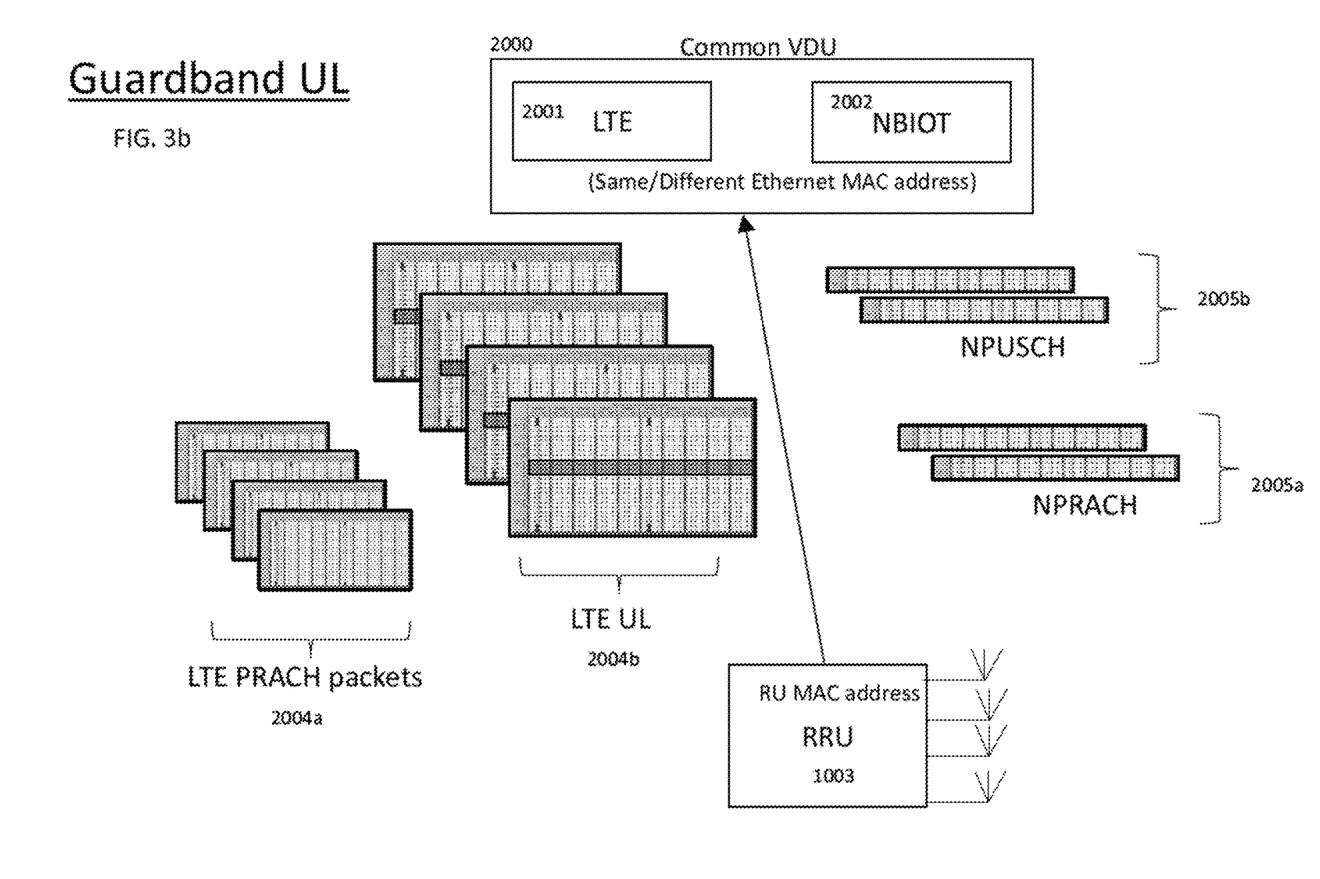
FIG. 3b is a block diagram illustrating an example embodiment of an RRU performing uplink (UL) transmission to LTE and NBIOT (in NBIOT guardband mode) via a single common VDU.

FIG. 3b is a block diagram illustrating an example embodiment of an RRU 1003 performing uplink (UL) transmission to the single common VDU 2000 for LTE 2001 and NBIOT 2002 (in NBIOT guardband mode). The UL transmission shown in FIG. 3b includes the following information elements: i) for LTE, Physical random access channel (PRACH) packets 2004a and LTE UL data 2004b; and ii) for NBIOT, narrowband physical random access channel (NPRACH) 2005a packets and narrowband physical uplink shared channel (NPUSCH) 2005b packets. The single common VDU 2000 can have the same ethernet MAC address for the LTE 2001 and NBIOT 2002, or different ethernet MAC addresses can be assigned for the LTE 2001 and NBIOT 2002.

According to an example embodiment of the present disclosure, support of NBIOT in module capability of O-RAN RU (or O-RU) is provided by adding (addition underlined below) enhanced definition to following two parameters (supportedtechnology-dl and supportedtechnology-ul) in YANG model under RU capability:

- supportedtechnology-dl
    - o enum range of type enhanced to support NBIoT

```
leaf-list supported-technology-dl {
  type enumeration{
    enum LTE {
      description "LTE is supported in DL path.";
    }
    enum NR {
      description "NR is supported in DL path.";
    }
    enum DSS_LTE_NR {
```

```
            if-feature DSS_LTE_NR;
            description
              "DSS is supported in the DL, which implicitly means LTE and NR are also
              BOTH supported in the DL.";
          }
          enum NBIOT {
            description "NBIOT StandAlone mode supported by RU";
          }
          enum NBIOT-inband-LTE {
            description "NBIOT inband mode over LTE carrier supported by RU";
          }
          enum NBIOT-guardband-LTE {
            description "NBIOT guard band mode over LTE carrier supported by RU";
          }
          enum NBIOT-inband-NR {
            description "NBIOT inband mode over NR carrier supported by RU";
          }
          enum NBIOT-guardband-NR {
            description "NBIOT guard band mode over NR carrier supported by RU";
          }
      }
  }
• supportedtechnology-ul
      ○ enum range of type enhanced to support NBIoT
  leaf-list supported-technology-ul {
    type enumeration{
      enum LTE {
        description "LTE is supported in UL path.";
      }
      enum NR {
        description "NR is supported in UL path.";
      }
      enum DSS_LTE_NR {
        if-feature DSS_LTE_NR;
        description
          "DSS is supported in the UL, which implicitly means LTE and NR are also
          BOTH supported in the UL.";
      }
      enum NBIOT {
        description "NBIOT StandAlone mode supported by RU";
      }
      enum NBIOT-inband-LTE {
        description "NBIOT inband mode over LTE carrier supported by RU";
      }
      enum NBIOT-guardband-LTE {
        description "NBIOT guard band mode over LTE carrier supported by RU";
      }
      enum NBIOT-inband-NR {
        description "NBIOT inband mode over NR carrier supported by RU";
      }
      enum NBIOT-guardband-NR {
        description "NBIOT guard band mode over NR carrier supported by RU";
      }
    }
  }
```

According to an example embodiment of the present disclosure, capability of the O-RAN RU to support NBIOT (e.g., at least one of inband, guardband and/or standalone mode) for each endpoint can be shown by the O-RAN RU by exposing the supported-technology-dl and supported-technology-ul parameters under tx-arrays (transmit) and/or rx-arrays (receive). Example possible values for the supported-technology-dl and supported-technology-ul parameters can be, e.g., as described above in connection with the enhanced definition, or as provided below (addition underlined below):

```
leaf-list supported-technology-dl {
  type enumeration{
    enum LTE {
      description "LTE is supported in DL path.";
    }
    enum NR {
      description "NR is supported in DL path.";
    }
    enum DSS_LTE_NR {
      if-feature DSS_LTE_NR;
      description
        "DSS is supported in the DL, which implicitly means LTE and NR are also
        BOTH supported in the DL.";
    }
```

```
    enum GSM {
        description "GSM is supported in DL path.";
    }
    enum UMTS {
        description "UMTS is supported in DL path.";
    }
    enum NBIOT {
        description "NBIOT StandAlone mode supported by RU";
    }
    enum NBIOT-LTE {
        description "NBIOT inband/guard band mode over LTE carrier supported by RU";
    }
    enum NBIOT-NR {
        description "NBIOT inband/guard band mode over NR carrier supported by RU";
    }
  }
}
leaf-list supported-technology-ul {
    type enumeration{
        enum LTE {
            description "LTE is supported in UL path.";
        }
        enum NR {
            description "NR is supported in UL path.";
        }
        enum DSS_LTE_NR {
            if-feature DSS_LTE_NR;
            description
              "DSS is supported in the UL, which implicitly means LTE and NR are also
              BOTH supported in the UL.";
        }
        enum GSM {
            description "GSM is supported in UL path.";
        }
        enum UMTS {
            description "UMTS is supported in UL path.";
        }
        enum NBIOT {
            description "NBIOT StandAlone mode supported by RU";
        }
        enum NBIOT-LTE {
            description "NBIOT inband/guard band mode over LTE carrier supported by RU";
        }
        enum NBIOT-NR {
            description "NBIOT inband/guard band mode over NR carrier supported by RU";
        }
    }
}
```

According to an example embodiment of the present disclosure, LTE (and/or 5G NR) and NBIOT (e.g., in inband and/or guardband mode) configure separate endpoints at the O-RAN RU. In this example embodiment, separate Extended Antenna Carrier Identifiers (Eaxc-ID eAxC IDs) will be used for LTE (and/or 5G NR) and NBIOT (e.g., in inband and/or guardband mode). This example embodiment is applicable to both i) the case in which LTE (and/or 5G NR) and NBIOT are hosted on the single common VDU, and ii) the case in which LTE (and/or 5G NR) and NBIOT are hosted on separate VDUs.

According to an example embodiment of the present disclosure, a new parameter is added under low-level-tx-endpoints and/or low-level-rx-endpoints of User-plane YANG model defined in ORAN fronthaul M-plane specification, thereby enabling the O-RAN RU to know the mapping of NBIOT endpoint to corresponding LTE/NR endpoint, which in turn enables O-RAN RU to combine LTE/NR signal and NBIOT inband/guardband signal in DL (and to separate these signals in UL). One example addition of optional parameter (underlined below) to low-level-tx-endpoints to point to NBIOT's low-level-tx-endpoints is shown below:

```
+--rw low-level-tx-endpoints* [name]
   | +--rw name
   ...
   ...
   | +--rw e-axcid
   | | +--rw o-du-port-bitmask   uint16
   | | +--rw band-sector-bitmask uint16
   | | +--rw ccid-bitmask   uint16
   | | +--rw ru-port-bitmask   uint16
   | | +--rw eaxc-id    uint16
      | +--rw nbiot-low-level-tx-endpoint?   uint16
   ...
   ...
```

One example addition of optional parameter (underlined below) to low-level-rx-endpoints to point to NBIOT's low-level-rx-endpoints is shown below:

```
+--rw low-level-rx-endpoints* [name]
   | +--rw name
   ...
   ...
   | +--rw e-axcid
   | | +--rw o-du-port-bitmask   uint16
   | | +--rw band-sector-bitmask uint16
   | | +--rw ccid-bitmask   uint16
```

```
| | +--rw ru-port-bitmask    uint16
| | +--rw eaxc-id    uint16
     | +--rw nbiot-low-level-rx-endpoint?   uint16
     ...
  ...
```

Figure 4:
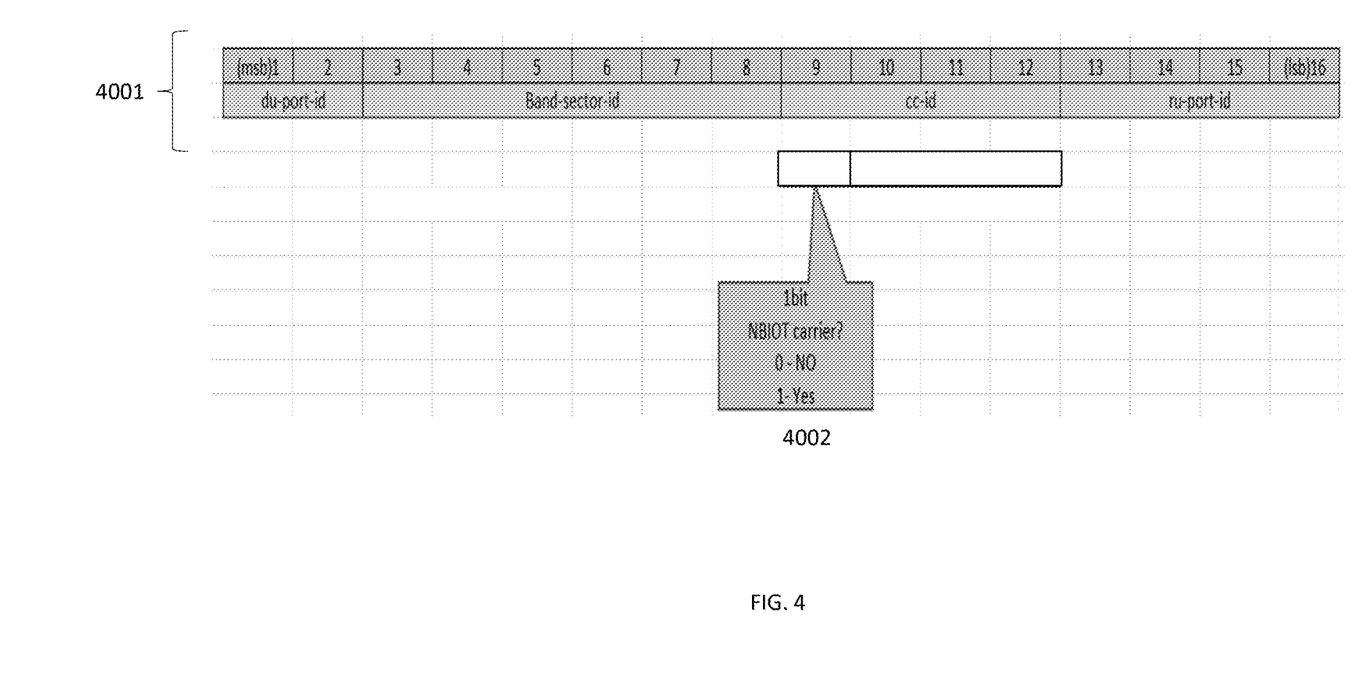
FIG. 4 is a block diagram illustrating an example of how a bit field in the existing Extended Antenna Carrier Id (eAxC-ID) parameter is used to determine the relation between LTE/NR and NBIOT (e.g., in inband and/or guardband mode) end points.

According to an example embodiment of the present disclosure, as an alternative to adding a new parameter to indicate the mapping between the end points of LTE/NR and NBIOT (e.g., in inband and/or guardband mode), a bit field in the existing Extended Antenna Carrier Identifier (eAxC-ID) parameter is used to determine the relation between LTE/NR and NBIOT (e.g., in inband and/or guardband mode) end points. FIG. 4 is a block diagram illustrating an example of how a bit field in the existing Extended Antenna Carrier Id (eAxC-ID) parameter is used to determine the relation between LTE/NR and NBIOT (e.g., in inband and/or guardband mode) end points. As shown in FIG. 4, most significant bit of cc-id is used for identifying either the NBIOT carrier or LTE/NR carrier. In the example shown in FIG. 4, the value of zero for the most significant bit of cc-id would mean LTE/NR carrier, and the value of one would mean NBIOT carrier, as referenced by block 4002. LTE/NR and NBIOT eAxC-IDs shall have the same cc-id value except for the most significant bit of cc-id. As an example, for the 16-bit field of eAxC-ID 4001 shown in FIG. 4, which includes du-port-id field (bits 1-2), band-sector-id (bits 3-8), cc-id (bits 9-12), and ru-port-id (bits 13-16), 00-000000-0011-0001 is the LTE/NR carrier's eAxC ID which is implicitly mapped to NBIOT carrier eAxC ID 00-000000-1011-0010.

According to an example embodiment of the present disclosure, O-DU instructs O-RU to detect NBIOT Physical random access channel (NPRACH) by sending an existing O-RAN section type-3 C-Plane message. In one example implementation, this O-RAN section type-3 C-Plane message can be sent once per symbol group. Alternatively, O-RAN section type-3 C-Plane message can be sent once per repetition. In the implementation involving sending of the O-RAN section type-3 C-Plane message once per symbol group, the O-RAN section type-3 C-Plane message is sent at the subframe where NPRACH symbol group starts. As the symbol group is not aligned to sub-frame, offset from the current sub-frame shall be mentioned. In the implementation involving sending of the O-RAN section type-3 C-Plane message once per repetition, the O-RAN section type-3 C-Plane message is sent at the subframe where NPRACH repetition starts. As the repetition is not aligned to sub-frame, offset from the current sub-frame shall be mentioned.

According to an example embodiment of the present disclosure, required parameters to detect NPRACH are sent from O-DU to O-RU via M-plane during User-Plane configuration. O-RU will be able to detect NPRACH without receiving any control plane message from O-DU based on the parameters shown below configured via M plane:

```
+--rw rx-array-carriers* [name]
    ...
    ...
    | --rw nprach-StartTime?                   uint16
    | --rw numRepetitionsPerPreambleAttempt?   uint8
    | --rw nprach-Periodicity?                 uint16
    | --rw nprach-SubcarrierOffset?  uint8
    | --rw nprach-NumSubcarriers?  uint8
    | --rw nprach-gap?  uint16
    ...
```

The invention claimed is:

1. A method of enabling Narrowband Internet of Things (NBIOT) transport over fronthaul (FH) interface between distributed unit (DU) and radio unit (RU) for at least one of 4G Long Term Evolution (LTE) network and 5G New Radio (NR) network, the method comprising:
   receiving, by the RU capable of at least one of NBIOT inband mode and NBIOT guardband mode, i) at least one of LTE and NR in-phase and quadrature (IQ) samples associated with a first endpoint, and ii) NBIOT IQ samples associated with a second endpoint; and
   configuring the RU to be able to combine, in at least one of frequency domain and time domain, i) the at least one of LTE and NR in-phase and quadrature (IQ) samples associated with the first endpoint, and ii) the NBIOT IQ samples associated with the second endpoint;
   wherein one of:
   a) the RU capable of at least one of NBIOT inband mode and NBIOT guardband mode receives i) the at least one of LTE and NR in-phase and quadrature (IQ) samples from a first virtualized distributed unit (VDU), and ii) the NBIOT IQ samples from a second VDU; or
   b) the RU capable of at least one of NBIOT inband mode and NBIOT guardband mode receives from a single common VDU both i) the at least one of LTE and NR in-phase and quadrature (IQ) samples associated with the first endpoint, and ii) the NBIOT IQ samples associated with the second endpoint;
   wherein the RU is Open Radio Access Network (O-RAN) compliant, and wherein an additional parameter is added under at least one of low-level-tx-endpoints and low-level-rx-endpoints of user-plane YANG model defined in O-RAN fronthaul (FH) management-plane specification to indicate a mapping between the first and second end points of i) the at least one of the LTE and the NR, and ii) the NBIOT.

2. The method according to claim 1, when the RU is configured to combine i) the at least one of LTE and NR in-phase and quadrature (IQ) samples associated with the first endpoint, and ii) the NBIOT IQ samples associated with the second endpoint one of: before performing fast Fourier transform (FFT) or after performing the FFT.

3. The method according to claim 1, wherein the RU is configured to support the NBIOT by adding enhanced definition of parameters supported-technology-dl and supported-technology-ul for RU capability in the YANG model.

4. The method according to claim 3, wherein the RU is configured to expose its capability to support the NBIOT for each endpoint by exposing, to the at least one of the 4G LTE network and the 5G NR network, at least one of the supported-technology-dl parameter and the supported-technology-ul parameter under at least one of transmit tx-arrays and receive rx-arrays.

5. The method according to claim 1, wherein at least one of:
   a) separate endpoints are configured at the RU by i) the at least one of the LTE and the NR, and ii) the NBIOT; and b) a first Extended Antenna Carrier Id (eAxC-ID) is used for the at least one of the LTE and the NR, and a second eAxC-ID is used for the NBIOT.

6. The method according to claim 1, wherein:
a bit field in an Extended Antenna Carrier Identifier (eAxC-ID) parameter is used to indicate a relation the mapping between the first and second end points of i) the at least one of the LTE and the NR, and ii) the NBIOT.

7. The method according to claim 1, wherein:
the RU, the DU, the first VDU, the second VDU and the single common VDU are Open Radio Access Network (O-RAN) compliant; and
at least one of the DU, the first VDU, the second VDU and the single common VDU sends an O-RAN section type-3 Control-Plane message to the RU to instruct the RU to detect NBIOT Physical random access channel (NPRACH).

8. The method according to claim 1, wherein:
the RU, the DU, the first VDU, the second VDU and the single common VDU are Open Radio Access Network (O-RAN) compliant; and
at least one of the DU, the first VDU, the second VDU and the single common VDU sends to the RU, via Management-plane during User-Plane configuration, parameters to detect NBIOT Physical random access channel (NPRACH).

9. A system for facilitating Narrowband Internet of Things (NBIOT) transport over fronthaul (FH) interface for at least one of 4G Long Term Evolution (LTE) network and 5G New Radio (NR) network, comprising:
a radio unit (RU) configured to: a) be capable of at least one of NBIOT inband mode and NBIOT guardband mode; and b) receive i) at least one of LTE and NR in-phase and quadrature (IQ) samples associated with a first endpoint, and ii) NBIOT IQ samples associated with a second endpoint; and
at least one distributed unit (DU) communicating with the RU, wherein the FH is between the RU and the DU;
wherein the RU is configured to be able to combine, in at least one of frequency domain and time domain, i) the at least one of LTE and NR in-phase and quadrature (IQ) samples associated with the first endpoint, and ii) the NBIOT IQ samples associated with the second endpoint;
wherein one of:
a) the RU capable of at least one of NBIOT inband mode and NBIOT guardband mode receives i) the at least one of LTE and NR in-phase and quadrature (IQ) samples from a first virtualized distributed unit (VDU), and ii) the NBIOT IQ samples from a second VDU; or
b) the RU capable of at least one of NBIOT inband mode and NBIOT guardband mode receives from a single common VDU both i) the at least one of LTE and NR in-phase and quadrature (IQ) samples associated with a first endpoint, and ii) the NBIOT IQ samples associated with a second endpoint;

wherein the RU is Open Radio Access Network (O-RAN) compliant, and wherein an additional parameter is added under at least one of low-level-tx-endpoints and low-level-rx-endpoints of user-plane YANG model defined in O-RAN fronthaul (FH) management-plane specification to indicate a mapping between the first and second end points of i) the at least one of the LTE and the NR, and ii) the NBIOT.

10. The system according to claim 9, when the RU is configured to combine i) the at least one of LTE and NR in-phase and quadrature (IQ) samples associated with the first endpoint, and ii) the NBIOT IQ samples associated with the second endpoint one of; before performing fast Fourier transform (FFT) or after performing the FFT.

11. The system according to claim 9, when the RU is configured to support the NBIOT by adding enhanced definition of parameters supported-technology-dl and supported-technology-ul for RU capability in the YANG model.

12. The system according to claim 9, when the RU is configured to expose its capability to support the NBIOT for each endpoint by exposing, to the at least one of the 4G LTE network and the 5G NR network, at least one of the supported-technology-dl parameter and the supported-technology-ul parameter under at least one of transmit tx-arrays and receive rx-arrays.

13. The system according to claim 9, wherein at least one of:
a) separate endpoints are configured at the RU by i) the at least one of the LTE and the NR, and ii) the NBIOT; and
b) a first Extended Antenna Carrier Id (eAxC-ID) is used for the at least one of the LTE and the NR, and a second eAxC-ID is used for the NBIOT.

14. The system according to claim 9, wherein:
a bit field in an Extended Antenna Carrier Identifier (eAxC-ID) parameter is used to indicate a relation the mapping between the first and second end points of i) the at least one of the LTE and the NR, and ii) the NBIOT.

15. The system according to claim 9, wherein:
the RU, the DU, the first VDU, the second VDU and the single common VDU are Open Radio Access Network (O-RAN) compliant; and
at least one of the DU, the first VDU, the second VDU and the single common VDU sends an O-RAN section type-3 Control-Plane message to the RU to instruct the RU to detect NBIOT Physical random access channel (NPRACH).

16. The system according to claim 9, wherein:
the RU, the DU, the first VDU, the second VDU and the single common VDU are Open Radio Access Network (O-RAN) compliant; and
at least one of the DU, the first VDU, the second VDU and the single common VDU sends to the RU, via Management-plane during User-Plane configuration, parameters to detect NBIOT Physical random access channel (NPRACH).

* * * * *